(12) United States Patent
Eriksson et al.

(10) Patent No.: US 7,134,355 B2
(45) Date of Patent: Nov. 14, 2006

(54) GEAR BOX FOR MOTOR VEHICLES

(75) Inventors: Anders Eriksson, Göteborg (SE);
Marcus Steen, Angered (SE)

(73) Assignee: Volvo Lastvagnar AB, Göteborg (SE)

( * ) Notice: Subject to any disclaimer, the term of this patent is extended or adjusted under 35 U.S.C. 154(b) by 24 days.

(21) Appl. No.: 10/709,384

(22) Filed: Apr. 30, 2004

(65) Prior Publication Data
US 2004/0261557 A1 Dec. 30, 2004

Related U.S. Application Data

(63) Continuation of application No. PCT/SE02/01821, filed on Oct. 7, 2002.

(30) Foreign Application Priority Data
Oct. 31, 2001 (SE) .................................. 0103620

(51) Int. Cl.
*F16H 3/08* (2006.01)
(52) U.S. Cl. ................... 74/333; 74/329; 74/336 R; 74/340
(58) Field of Classification Search ................. 74/329, 74/333, 335, 336 R, 340; 477/115, 116
See application file for complete search history.

(56) References Cited

U.S. PATENT DOCUMENTS

| | | | | |
|---|---|---|---|---|
| 4,078,631 A | | 3/1978 | Kadota et al. | .......... 180/105 E |
| 5,456,643 A | * | 10/1995 | Yamamoto et al. | .......... 477/110 |
| 5,761,628 A | * | 6/1998 | Steeby et al. | .................. 701/64 |
| 6,314,827 B1 | * | 11/2001 | Matsufuji | ..................... 74/325 |
| 6,869,377 B1 | * | 3/2005 | Steen | ........................... 475/81 |

FOREIGN PATENT DOCUMENTS

| | | |
|---|---|---|
| EP | 0300792 A2 | 1/1989 |
| EP | 0573901 A1 | 12/1993 |
| GB | 2214247 | * 8/1989 |

\* cited by examiner

*Primary Examiner*—Ha Ho
(74) *Attorney, Agent, or Firm*—Novak Druce & Quigg, LLP

(57) ABSTRACT

Method and device for providing an increment shifted transmission (9) for motor vehicles including an in-going shaft in a housing. At least one intermediate shaft in the housing exhibits at least one gear wheel (16, 17) in engagement with a gearwheel (12, 15) on the in-going shaft. A main shaft in the housing has gear wheels (15, 21, 22, 23) and is in engagement with gear wheels (18, 19, 20) on the intermediate shaft. At least one of the gear wheels in each neutrally engaging pair of gear wheels on the intermediate shaft and the main shaft are rotatably arranged about the shaft and by coupling members (13, 24, 25) being lockable onto its shaft and maneuvering members (40, 41, 42) co-operating with the coupling members controlled by a control unit (45) depending on signals fed to the control unit representative of various engine and vehicle data.

11 Claims, 2 Drawing Sheets

GEAR BOX FOR MOTOR VEHICLES

CROSS-REFERENCE TO RELATED APPLICATIONS:

The present application is a continuation patent application of International Application No. PCT/SE02/01821 filed 7 Oct. 2002 which was published in English pursuant to Article 21(2) of the Patent Cooperation Treaty, and which claims priority to Swedish Application No. 0103620-1 filed 31 Oct. 2001. Said applications are expressly incorporated herein by reference in their entireties.

TECHNICAL FIELD

The present invention relates to an increment shifted transmission for motor vehicles that includes an in-going shaft mounted in a housing. There is at least one intermediate shaft arranged in the housing, and which exhibits at least one gear wheel that is in engagement with a gear wheel on the in-going shaft. A main shaft is arranged in the housing with gear wheels which engage gear wheels on the intermediate shaft. At least one of the gear wheels in each pair of mutually engaging gear wheels on the intermediate shaft and the main shaft are rotateably arranged about its shaft and are, by means of coupling members, lockable on its shaft, and with maneuvering members which interact with the coupling members, and are controlled by a control unit depending on signals fed through the control unit representative of various engine and vehicle data.

BACKGROUND ART

In commercial vehicles such as, for example trucks and buses, use is often made of automatic or semiautomatic gear boxes. Such gear boxes can be likened to conventional manual gear boxes, with the difference that the shifting of gears is carried out by means of operating devices instead of manually by the driver.

Especially in heavy cargo vehicles, automatic gear boxes of the automatic increment shifted transmission kind are utilized. These have become more and more common as microcomputer technology has developed. It is now possible to, with the use of a control computer and a number of control devices, for example servo engines, precisely regulate the rpm of the engine, the engagement and disengagement of a disc coupling between the engine and the gear box, and the coupling members of the gear box relative to each other so that a smooth gear shift is always obtained at the proper rpm. One advantage with this kind of automatic gear box (as compared to a traditional automatic gear box with planetary gear steps and with a hydrodynamic torque converter on the inside) as regards heavy vehicles, is that it is simpler and more robust and can be produced at essentially lower costs than the traditional automatic gear box, and also, it has a higher degree of efficiency, which offers a possibility for lower fuel consumption.

The automatic gear box built on planetary gearing usually has one-way couplings between the planetary gear steps, which in the case of a driving engine in the automatic gear position will prevent torque transfer from the engine to the driving wheels, but which when transferring torque in the other direction; i.e., at zero gas and with the vehicle moving, disengages the gears and allows the engine to roll freely without engine braking, which brings about a lower fuel consumption by the use of the kinetic and position energy of the vehicle as compared to the case where the engine brakes.

A corresponding free wheel function of present variable gear boxes has so far been impossible to obtain in another manner than through manual disengagement of the disc coupling between the engine and the gear box.

There is thus a desire to obtain a free wheel function in an automated increment shifted transmission which corresponds to the free wheel function of a traditional automatic gear box with planetary gear steps and free wheel couplings. This desire is generally based on the need to, as far as possible, limit the fuel consumption of the engine.

U.S. Pat. No. 4,078,631 shows an arrangement in a vehicle comprising (including, but not limited to) a gear box with a mechanical free wheel device which can be automatically activated when the vehicle has reached a pre-set velocity in order to thus reduce the fuel consumption of the engine. In more detail, this previously known arrangement is configured so that the engine is turned off electronically when a certain pre-set velocity has been reached. A free wheel function is then activated by means of a separate mechanical decoupling which decouples the engine from the gear box automatically when the positive; i.e., the driving torque from the engine approaches zero.

A drawback of this previously known arrangement is that a possibly desired engine braking will not be possible since the engine is decoupled from the gear box. Also, this previously known system does not take into account variations regarding outer driving conditions, such as for example the slope of the road, possible wind against or with the vehicle, aerial resistance, rolling resistance, and similar effects.

DISCLOSURE OF INVENTION

An objective of the present invention is to provide an improved arrangement in a driving line for a vehicle which comprises an automated increment shifted transmission with a free wheel function.

This purpose is obtained in accordance with the present invention by means of a device that exemplarily takes the form of an increment shifted transmission for motor vehicles comprising a shaft mounted in bearings in a housing. At least one intermediate shaft is mounted in bearings in the housing and which exhibits at least one gear wheel in contact with a gear wheel on the in-going shaft. A main shaft is mounted in bearings in the housing with gear wheels which grip into gear wheels on the intermediate shaft. At least one of the gear wheels of each pair of interacting gear wheels on the intermediate shaft and the main shaft are rotateably mounted in bearings on its shaft, and by means of coupling members is lockable on its shaft. Maneuvering members are provided that interact with the coupling members. The maneuvering members are governed (controlled) by a control unit in dependence of signals that are fed to the control unit, and are representative of various engine and vehicle characteristics (data). The gear box, according to a preferred embodiment of the invention, is characterized in that the manoeuvring members are arranged to, in the case of inbound-signals to the control unit that indicate a predetermined driving condition at which the fuel consumption over the vehicle is optimally low, be set by means of the control unit so that a synchronized gear which is engaged at the moment is moved into a neutral position and the maneuvering members are arranged to deactivate the neutral position when the driving condition is no longer present.

By means of the presently disclosed invention, certain advantages are obtained. Primarily, it can be noted that the free wheel function according to the invention permits the engine to be driven on idling rpm's for minimal fuel consumption, for example when there is no need for the engine to deliver a driving torque, or when no braking capability is needed. Since the invention creates a possibility to, in a larger extent, run the engine at idling rpm's, conditions are also created for a lower sound level in and around the vehicle, which is an advantage as regards environment and comfort.

It can be noted that the invention is particularly suitable to be used for engines with a friction torque which is strongly dependent on the rpm, for example engines equipped with a so-called turbo compound aggregate. It can also be noted that the invention is particularly suitable to be utilized in cargo vehicles since it enables free wheeling in highly varying situations depending on wind and road conditions, possible cargo in the vehicle and other specific conditions.

BRIEF DESCRIPTION OF THE DRAWINGS

In the following description, the disclosed invention(s) will be explained in greater detail with reference to an example of a preferred embodiment of the invention that is shown in the appended figures, in which.

MODE FOR THE INVENTION

Figure 1:
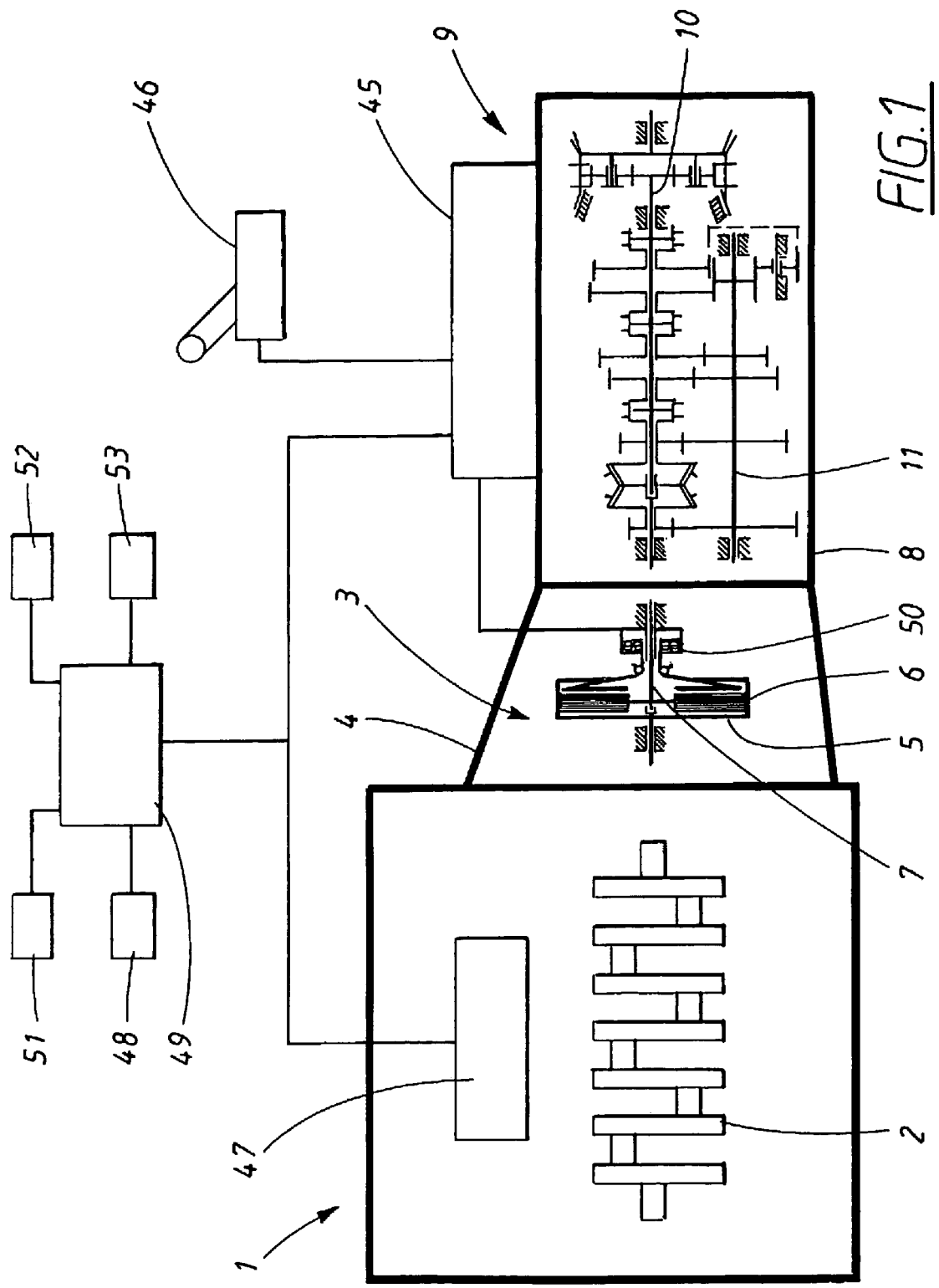
FIG. 1 shows the principles of an internal combustion engine with the associated clutch and gear box and control units for the same.

The present invention will now be described with reference to a preferred embodiment which is illustrated in the figures. FIG. 1 shows an engine 1 that is exemplarily shown as a six-cylinder internal combustion engine of the diesel engine type. The engine 1 comprises a crankshaft 2 which is coupled to a dry disc one disc coupling, generally noted with the numeral 3 which is encapsulated in a clutch housing 4. The crankshaft 2 is non-rotatably connected to the clutch housing 5 of the coupling 3, while its disc 6 is non-rotatably attached to an in-going shaft 7 which is rotatably mounted in the housing 8 of a gear box generally denoted with the numeral 9. In the housing 8 there is also a main shaft 8 comprised, and an intermediate shaft 11 which are rotatably mounted.

Figure 2:
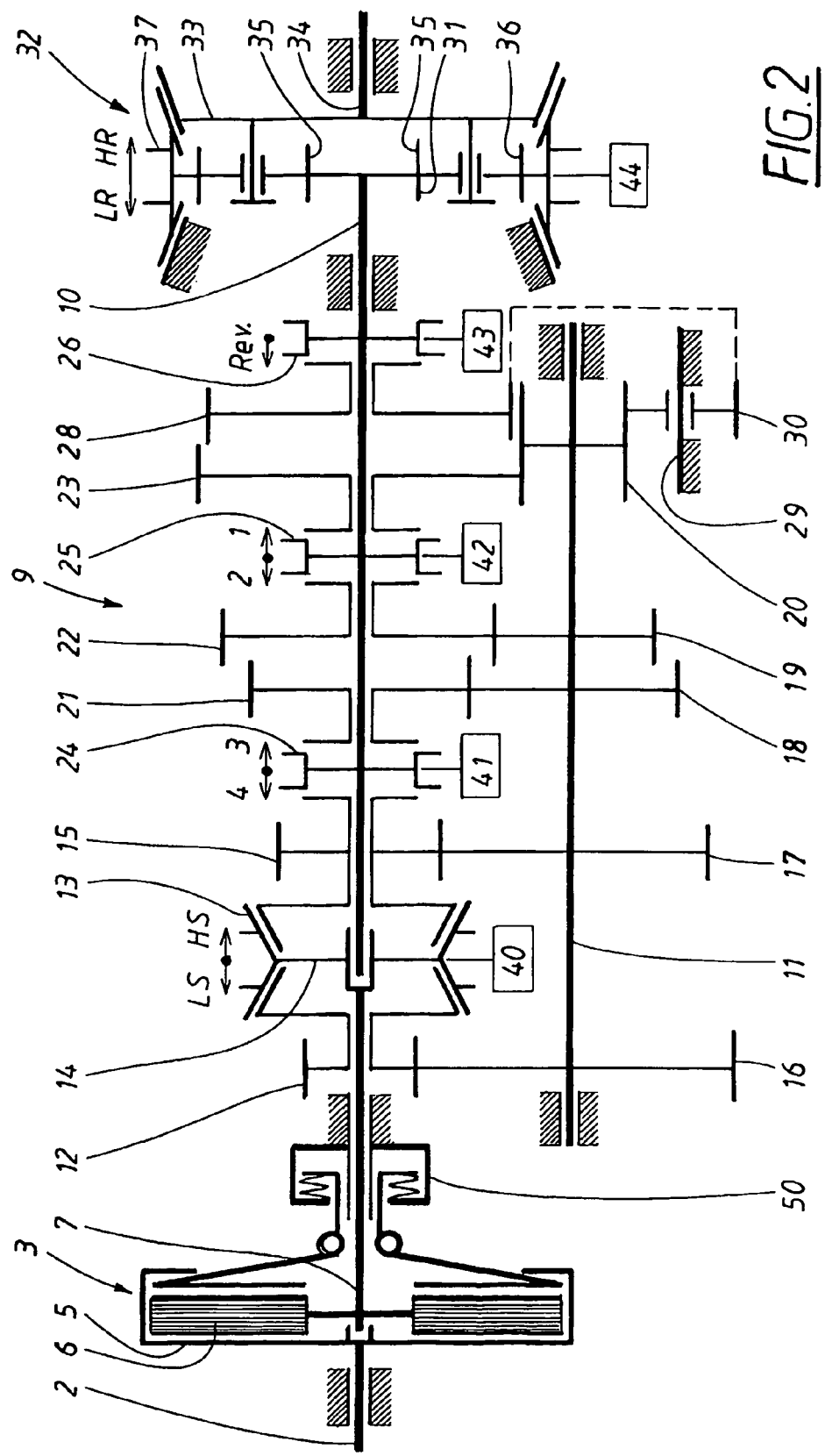
FIG. 2 which shows the clutch and the gear box of FIG. 1, but on an enlarged scale.

As can best be seen from FIG. 2, a gear wheel 12 is rotateably mounted on the in-going shaft 7 and able to locked onto the shaft by means of a coupling casing 13 which is equipped with synchronization members and which is non-rotatably but axially displaceably mounted on a hub 14 which is non-rotatably connected to the in-going shaft 7. By means of the coupling casing 13, a rotatably mounted gear wheel 15 on the main shaft 10 is lockable relative to the in-going shaft 7. With the coupling casing 13 in an intermediate position, both the gear wheels 12 and 15 are decoupled from their shaft 7. The gear wheels 12 and 15 engage the gear wheels 16 and 17 respectively, which are non-rotatably coupled to the intermediate shaft 11. On the intermediate shaft 11 there are further gear wheels 18, 19 and 20 that are non-rotatably arranged, but which engage rotatably arranged gear wheels 21, 22, 23 respectively on the main shaft 10 which are lockable to the main shaft by means of coupling casings 24 and 25 respectively, which in the example of an embodiment shown is without synchronization devices. On the main shaft 10, there is an additional gear wheel 28 rotatably arranged and in interaction with a rotatably arranged intermediate gear wheel 30 on a separate shaft 29, which in turn engages the intermediate shaft gear wheel 20. The gear wheel 28 is lockable on its shaft by means of a coupling casing 26.

The gear wheel couples 12, 16 and 15, 17 and the coupling casing 13 form a split gear with a low gear step LS and a high gear step HS. The gear wheel couple 15, 17 also together with the gear wheel pairs 21, 18, 22, 19, 23, 20 and 28, 30 forms a base gear box with four forward gears and one rearward gear. On the outgoing end of the main shaft, there is a gear wheel 31 fixedly arranged which forms the sun-wheel in a range gear box with two gears designated 32 of the planetary type whose planetary gear wheel carrier 33 is non-rotatably connected to a shaft 34 which forms the outgoing shaft of the gear box. The planetary gear wheel 35 of the range gear box 32 engages a ring wheel 36 which by means of a coupling casing 37 is lockable relative to the gear box housing 8 for low range LR and relative to the planetary gear wheel carrier 33 for high range HR. The coupling casings 13, 24, 25, 26 and 37 are displaceable as shown by the arrows in FIG. 2, with the gear positions shown in connection to the arrows being obtained. The displacement is obtained by servo devices 40, 41, 42, 43 and 44 which are schematically hinted at in FIG. 2, which can be electro-pneumatically maneuvered piston cylinder devices of the kind which is utilized in a gear box of the above described kind, which is marketed under the name Geartronic®.

The servo devices 40, 41, 42, 43 and 44 are controlled by an electronic transmission control unit 45 (see FIG. 1), comprising a micro computer in dependence of signals fed to the transmission control unit 45, which are representative of various engine and vehicle data which at least comprise the engine rpm, the vehicle's speed, the gas pedal position and, where applicable, engine brake on or off, when an electronic gear shifter 46 coupled to the transmission control unit 45 is in an automatic gear shifting position. When the shifter is in position for manual gear shifting, the gears are shifted by commands of the driver via the shifter 46.

Furthermore, the arrangement comprises an engine control unit 47, which is arranged to control the fuel injection to the engine 1 in dependence of the gas pedal position, which in turn is detected by means of a position sensor 48 for the gas pedal of the vehicle. The engine control unit 47 is also arranged to control an engine braking function in the vehicle. The position sensor 48 of the gas pedal is preferably connected to an additional control unit 49 in the form of a carriage control unit, which in turn is connected both to the engine control unit 47 and to the transmission control unit 45, with the latter controlling the air supply to an electro-pneumatic piston cylinder device 50 by means of which the coupling 3 can be put into neutral position.

A free wheeling function can be obtained by means of disengaging a synchronized split gear independently of which gear is engaged when free rolling of the vehicle is desired. The invention is not limited to this, but can also be utilized in order to disengage the synchronized gear which is used at the moment in a synchronized gear box without a split gear function.

In accordance with the invention, the transmission control unit 45 is programmed so that a "free wheeling" or "free wheel" function is activated depending on certain typical situations, which in particular correspond to driving conditions at which the fuel consumption of the vehicle is positively effected as compared to when the free wheeling function is not activated. This will be described in detail below. It can, for example, be assured that a braking torque is only permitted when requested by the driver, and that the free wheel function is activated when the vehicle—without utilizing any braking torque—would have a reduced fuel consumption.

The above-mentioned driving conditions can be detected by utilizing signals from a number of transducers and controls, which signals are detected and processed by the transmission control unit 45. These signals suitably comprise signals from the above-mentioned gear shifter 46 from the position transducer 48 for the gas pedal, and also from an auxiliary brake control 51, a position sensor 52 for the brake pedal of the vehicle and a cruise control device 53 for a cruise control arranged in the vehicle (which is described in detail below). These signals are fed to the carriage control unit 49, which in turn is connected to the transmission control unit 45. It can be noted that the foot brake alternatively can consist of some other kind of driver-activated brake, for example a brake control which is arranged in connection to the wheel of the vehicle, and which is arranged to, when activated by the driver, activate the brake system of the vehicle.

Concerning the auxiliary brake, the vehicle is suitably equipped with auxiliary brake functions which thus brake the vehicle in another way than via wheel brakes. Auxiliary brake functions can be of the primary retarder kind (for example in the form of a compression brake or exhaust gas brake) or of the secondary retarded kind (for example in the form of an electromagnetic or hydraulic auxiliary brake). The respective auxiliary brake function can be applied automatically by means of suitable control from the carriage control unit 49.

In a possible embodiment, the auxiliary brake control 51 can be maneuvered to a plurality of positions for example "A", "1", "2", "3" and "B". Position "A" can then be said to correspond to an automatic auxiliary braking (which is controlled by the carriage control unit 49, if the vehicle is driven by means of the cruise control). This means that the auxiliary brake is controlled with regard to a pre-set speed, with the auxiliary brakes generally being used in an increased extent the higher the speed is relative to the pre-set speed. If the vehicle is not driven by means of the cruise control, the auxiliary brake will be regulated depending on how far the brake pedal is pressed down. Furthermore, position "1" corresponds to auxiliary braking with only a part of the brake torque available from the auxiliary braking functions, for example 15%. Position "2" can correspond to auxiliary braking with a slightly larger part of the braking torque available, for example 40%, while position "3" can correspond to auxiliary braking with all available braking torque (100%) from the auxiliary braking functions. The "OFF" position means that no auxiliary brake function is activated. Position "B" is used to activate a special gear choosing program, which chooses gears so that an optimal engine braking effect is obtained.

When the driver, for example, does not depress the gas pedal and the gear box is not disengaged from the engine, the engine will also have a slight braking effect due to friction losses in the engine and due to further devices, such as for example a cooling fan, an air compressor, an air conditioning system or similar additional devices. Other parameters such as, for example, the temperature of the engine oil, will also affect the friction resistance of the engine. Such parameters can then be taken into account when deciding if an activated free wheel function would result in a lower total fuel consumption than if the free wheel function is not activated.

The transmission control unit 45, according to the invention, is arranged to continuously calculate whether the vehicle would have a lower fuel consumption if the free wheel function were to be activated (without any braking torque being applied). If the control unit detects a state where the fuel consumption would be optimally low and if, in addition, the driver does not desire any braking torque, the free wheel function can be activated. In practice, this means that the above-mentioned servo devices, 40, 41, 42, 43 and 44 are so controlled by the transmission control unit 45 that the free wheel function is obtained.

The function of the invention will now be described with reference to a number of typical driving situations, and how the free wheel function is utilized in the respective situations. In the following examples, it can be assumed that the vehicle has a certain speed (vset) which corresponds to a continuous state where the driver does not request more driving power from the engine than is needed to maintain said speed.

According to a first example of a driving situation, it can be assumed that the vehicle is driven in such a way that it would accelerate without the gas pedal being depressed, and without the auxiliary brake being utilized. This, for example, corresponds to driving in a steep downwards slope. The vehicle will then accelerate despite a certain engine braking effect (due to inner friction in the engine and other possibly operating devices, for example air conditioning) and despite the gas pedal not being depressed. In such a case, no free wheel function is utilized since this would lead to the vehicle accelerating even more, which is not desirable in the driving situation in question. In this position, the transmission control unit 45 will thus see to it that the free wheel function is not activated, since the fuel consumption would not be optimally low if the free wheel function were activated. The fuel feed is completely shut off, since the vehicle accelerates despite the engine braking. Preferably, there is a check of whether the vehicle's speed has obtained a predetermined maximum allowed speed (vmax). If this happens, an auxiliary braking function will preferably be engaged so that the vehicle does not continue accelerating.

A further possible driving situation is characterized if the vehicle would retard if the free wheel function were not activated (i.e. if the gas pedal is all the way up, and no auxiliary brakes are applied, with the driving line being engaged and a certain amount of engine braking taking place) and would accelerate if the free wheel function were to be activated. This situation normally corresponds to the vehicle being driven in a medium steep downwards slope, i.e. a less steep downwards slope than the above-mentioned driving situation. In such a situation, the free wheel function will be activated if the fuel consumption becomes optimally low; i.e., if the total fuel consumption for keeping the engine at idling is lower than the case of not activated free wheeling function and using the engine to accelerate the vehicle's speed to the same final velocity (which would have been the case with an activated free wheel function). This, however, supposes that the speed of the engine is below a certain maximal value (vmax), which in turn is higher than the above-mentioned speed (vset). At higher speeds than vmax, an auxiliary brake will automatically be activated by means of the carriage control unit 49.

If the free wheel function is activated, the vehicle will accelerate. In the driving situation in question, the free wheel function is thus chosen since the kinetic energy of the vehicle increases up to the maximum speed at which an automatic auxiliary brake function is activated. The alternative is thus a slightly increased throttle in order to maintain the set desired speed, which requires (costs) more fuel than to keep the engine running at idling with an activated free wheel function.

A third driving situation is characterized in that the vehicle would retard if the free wheel function were not to be activated and would maintain the constant speed (vset) during a certain period of time if the free wheel function were instead to be activated. This normally corresponds to the vehicle being driven at a slight downwards slope. The vehicle will thus retard if its driving line is engaged. If the free wheel function on the other hand is engaged, the vehicle will maintain an essentially constant speed. In such a condition, the transmission control unit 45 will activate the free wheel function. The alternative would then be a certain amount of throttle in order to maintain the desired speed which, however, costs more fuel than maintaining the engine at idling in the free wheel position.

In a fourth driving situation, the vehicle would retard if the free wheel function were activated and would retard if the free wheel function were not activated. This situation can arise when driving on essentially plane ground. In such a situation, the free wheel function will be activated if the fuel consumption becomes optimally low; i.e., if the total fuel consumption for keeping the engine idling is lower than in the case of a not activated free wheel function, with the engine being used to accelerate the speed of the vehicle to the same final velocity (which would have been the case with activated free wheel function).

The vehicle will thus retard if the driving line is engaged. If the free wheel function is activated, the vehicle will also retard, but not as much as when the driving line is engaged; i.e., the vehicle will roll farther before arriving at a lowest allowed speed (vmin). Free wheeling is chosen here under the condition that:

$$Wt + Wv < Wvset, \text{ where}$$

Wt=the energy consumption (i.e. the fuel consumption) for keeping the engine and other possibly operating devices running, Wv=the energy cost (i.e. fuel consumption) for accelerating the vehicle up to vset, and Wvset=the fuel cost for having the driving line engaged during the same distance with the engine driving (which would cause a certain fuel consumption).

In this way, a determination is made in the transmission control unit 45 whether or not the kinetic and movement energy of the vehicle can be utilized in order to obtain a low fuel consumption when the vehicle has a slow roll and when a free wheeling function can thus be engaged.

At the above-mentioned driving situations, essentially no wind has been assumed. If there is, for example, a strong wind facing the vehicle or from the rear of the vehicle, other results can be had than those described above.

Below, there will follow a more detailed description of a number of various possible driving conditions where the free wheel function according to the invention can be activated or deactivated respectively. In the following examples, it can be assumed that the vehicle is driven either by means of a throttle increase being requested by means of the gas pedal, or by means of a cruise control function which is controlled by means of the above-mentioned control device 53. The cruise control as such is previously known, and is based on the driver using the control device 53 to set a desired speed (vcc) of the vehicle. The carriage control unit 49 controls the fuel feed, and the transmission control unit 45 controls the gear shifts and the like so that the desired speed is maintained.

The cruise control function can also be complemented with an automatic braking function in which an auxiliary brake is activated automatically at a speed (vbc), which corresponds to the factual speed of the vehicle exceeding the speed which has been set by the control 53 by a certain maximum value. This maximum value can, for example, be in the interval 3–13 km/h and thus constitutes a margin which allows the speed of the vehicle to become slightly higher than the desired set value (vcc). When this higher speed (vbc) has been obtained, an auxiliary brake will thus be activated.

The following descriptions of different conditions for engaging or disengaging respectively, of the free wheel function can be said to be simplifications which can suitably be used when controlling the free wheel function by means of the transmission control unit.

During normal driving by means of the gas pedal (i.e. as opposed to driving by means of a cruise control), in the exemplary embodiment, all of the following conditions i)–vi) are fulfilled in order for the free wheel function of the present invention to be activated:

i) the gear shift is in the "A" position corresponding to automatic gear shift (which can be detected by means of the gear shifter 46);

ii) the auxiliary braking control 51 is in the "A" position (i.e. auxiliary braking is automatic according to need);

iii) the currently chosen gear is within a predetermined interval of gears, and preferably is one of the high range gears of the gear box (which can be determined by means of the transmission control unit 45);

iv) the foot brake (or alternatively some other kind of driver activated brake) is not depressed (which can be determined by means of a corresponding position sensor 52);

v) the vehicle does not roll in too steep a slope (which can be calculated in the transmission control unit 45 by means of the measurement signals available); and vi) the gas pedal is not depressed (which can be determined by means of the corresponding position sensor 48).

If all of the above mentioned conditions are fulfilled, the transmission control unit 45 will activate the free wheel function.

When activating the free wheel function, the transmission control unit 45 first controls the engine rpm so that no torque is transferred between the in-going shaft 7 of the gear box and the main shaft 10. Following this, the transmission control unit 45 gives a signal for decoupling the clutch 3 (by means of devices 50). Following this, the transmission control unit 45 gives a signal to the servo device 40 to set the coupling casing 13 in the neutral position, following which the engine can be controlled to idling rpm's. The driving line is now disengaged, and the vehicle can roll freely. By decoupling a synchronized split gear, the free wheel function is obtained by means of disengaging one and the same gear independently of which gear is engaged in the base gear box.

In order for the free wheel function according to the invention to be deactivated during driving by means of the gas pedal (i.e. as opposed to driving with a cruise control), at least one of the following conditions i)–vi) should be fulfilled:

i) the gear control 46 is not in the "A" position;

ii) the auxiliary brake control 51 is not in the "A" position;

iii) the chosen gear is outside of a predefined interval of gears, which suitably corresponds to one of the high range gears of the vehicle;

iv) the foot brake is depressed (which can be determined by means of corresponding position sensors 52);

v) the gas pedal is depressed (which can be determined by means of corresponding position sensors 48); and
vi) the engine has stopped (which in turn can be because of possible electrical malfunctions, lack of fuel etc.).

If any of the above conditions i)–vi) is fulfilled, an active free wheeling function will be deactivated.

The transmission control unit 45 is programmed to deactivate the free wheel function by means of the engine rpm first being controlled to an rpm which enables synchronization, subsequent to which the coupling casing 13 is displaced to its previous coupling position. The driving line is now engaged and driving, or engine braking is again possible.

The main conditions for activation of the free wheel function according to the preferred embodiment when driving by means of the above-mentioned cruise control function will now be described with all of the following conditions i)–v) desirably being fulfilled:
i) the gear control is in the "A" position;
ii) the auxiliary brake control 51 is in position A, 1, 2 or 3;
iii) the gear chosen is in a predefined upper interval preferably one of the high range gears of the gear box;
iv) there is no demand for auxiliary braking (which is determined by means of the control unit 45); and
v) there is no demand for fuel which will result in a delivered positive torque from the driving line being present (which is determined by means of the control unit 45).

Thus the free wheel function will be activated if all of the above conditions i)–v) are fulfilled.

In order for the free wheel function according to the invention to be deactivated when the engine is driven by means of cruise control, at least one of the following conditions i)–vii) must be fulfilled:
i) the gear shift control is not placed in the "A" position;
ii) the gear chosen is not one of the high range gears;
iii) there is a demand for auxiliary braking;
iv) there is a demand for fuel which results in a positive torque from the driving line;
v) the gas pedal is depressed; or
vi) the engine has stopped.

If any of the above conditions i)–vii) is fulfilled, an active free wheel function will thus be deactivated.

Thus, the free wheel function according to the invention can be activated both when the engine is driven by the gas pedal and by the cruise control. Also, the free wheel function can always be disengaged by placing the auxiliary braking control 51 in the "OFF" position; i.e., a completely inactive auxiliary braking.

Additional conditions can be utilized to determine if the free wheel function should be activated or not. The free wheel function can be activated if the speed of the vehicle is above the speed set by the cruise control but at the same time below the set speed (vbc) at which auxiliary braking takes place as described above.

Furthermore, the transmission control unit 45 can be arranged with a computation model for determining a value which corresponds to the vehicle at the moment being driven in a steep downwards slope or a steep upwards slope. This can be done by the transmission control unit 45 calculating a value which corresponds to the driving resistance of the vehicle, starting from signals relating to engine torque, the acceleration of the vehicle and the mass of the vehicle. In total, the signals can be used as an indication of the slope of the road and any possible winds facing or from the behind of the vehicle. This information can in turn be utilized for determining the optimal gear for the gear box.

According to the invention, the free wheel function will thus not be activated at steep downwards slopes (for example at a downwards slope which exceeds a pre-set threshold value) where a lower fuel consumption is obtained by the driving line being engaged so that the engine is driven by the carriage without obtaining any non-desired retardation.

In the case of a too-steep upwards slope, it is in a similar manner assumed that additional gas is always needed, and thus the free wheel function is not activated at such conditions either.

Suitably, according to the invention, a certain time delay is utilized when activating the free wheel function. Since it takes, for example, approximately half a second from the time when the driver moves his foot from the gas to the brake pedal, the free wheel function should not be able to be activated during this period, since the intention of the driver is then to brake the vehicle (which as such is not intended to permit free wheeling). Thus, the activation of the free wheel function is delayed when the above-mentioned conditions are fulfilled, in order to avoid unintended free wheeling.

When the free wheel function has been activated in any of the above-mentioned driving situations, there is an interruption in the driving line since the split gear is in a neutral position, and it can be noted that the split gear is synchronized. If the engine is to stop during activated free wheeling function, the transmission control unit 45 is arranged to carry out the following steps:
i) the free wheel function is deactivated;
ii) the clutch 3 is disengaged (using the device 50);
iii) the split gear is engaged;
iv) the clutch 3 is engaged; and
v) the engine is driven by the movement of the vehicle.

In accordance with the invention, a free wheel function is activated during certain driving conditions at which the fuel consumption is affected in a positive direction, and optimized as compared to if the free wheel function had not been activated. The free wheel function is particularly suitable for use in engines which have large inner friction losses, especially where the friction losses are greatly dependent on the rpm's. Furthermore, the free wheel function is advantageous in slight and medium slight downwards slopes when driving with the wind from behind, and when driving where a certain speed reduction of the engine is desirable (i.e. a reduction of the speed without use of the auxiliary brakes and/or the inner friction of the engine). The free wheel function is also advantageous at the end of steeper downwards slopes, where the speed of the vehicle can be allowed to increase by means of gravitation.

The free wheel function according to the invention is particularly suitable for use in heavier cargo vehicles, where many different kinds of driving conditions can be present, for example a vehicle with or without cargo or with different kinds of driving resistance (due to wind facing the vehicle or coming from behind the vehicle, and upwards or downwards slope when driving). The invention is then adapted to an automatic control of a free wheel function according to the driving conditions in question, so that optimally low fuel consumption and engine noise are obtained.

The invention is not limited to the embodiment described above, but can be varied within the scope of the appended claims. For example, the invention can be utilized in various kinds of vehicles, for example trucks and cars.

The invention claimed is:

1. An increment shifted transmission (9) for motor vehicles comprising an in-going shaft mounted in a housing (8), at least one intermediate shaft (11) arranged in the housing, which exhibits at least one gear wheel (16–17) in engagement with a gearwheel (12, 15) on the in-going shaft, a main shaft (10) arranged in the housing with gear wheels (15, 21, 22, 23) which engage gear wheels (18, 19, 20) on the intermediate shaft, with at least one of the gear wheels in each pair of mutually engaging gear wheels on the intermediate shaft and the main shaft being rotatably arranged about its shaft and being, by means of coupling members (13, 24, 25), lockable on its shaft, and with maneuvering members (40, 41, 42) which interact with the coupling members and are controlled by a control unit (45) depending on signals fed through the control unit representative of various engine and vehicle data wherein the maneuvering members (40, 41, 42) are arranged to, in the case of in-signals to the control unit (45) which indicate a predetermined driving condition at which the fuel consumption of the vehicle is optimally low, be set by means of the control unit (45) so that a synchronized gear which is engaged at the time is set in neutral position, and in that the maneuvering members (40, 41, 42) are arranged to deactivate said neutral position when said driving condition is no longer present and wherein the control unit (45) is arranged to activate a free wheel function at at least one of the following driving conditions when driving with a predetermined speed (vset; vcc): i) the vehicle is considered to accelerate at an activated free wheel function, and retard without said activated free wheel function; ii) the vehicle is considered to maintain constant speed at said activated free wheel function and retard without said activated free wheel function, and iii) the vehicle is considered to retard at said activated free wheel function and retard without said activated free wheel function.

2. The gear box (9) as recited in claim 1, wherein the control unit (45) is arranged to not activate said free wheel function in a driving situation in which the vehicle is considered to accelerate without said activated free wheel function.

3. The gear box (9) as recited in claim 1, wherein the control unit (45) is arranged to give an output signal to the maneuvering devices (40, 41, 42) to place said synchronized gear in the neutral position when the following conditions are fulfilled: i) a gear control (46) of the gear box (9) is in a position which corresponds to automatically controlled gear shifting, ii) an auxiliary brake arranged in the vehicle is arranged for automatic activation when needed, iii) the current gear of the gear box is within a pre-set upper interval, iv) a driver activated brake in the vehicle is not activated, v) the vehicle is rolling on essentially plane or slightly outwards sloping ground, and vi) a gas pedal arranged in the vehicle is not depressed.

4. The gear box (9) as recited in claim 3, wherein the control unit (45) is arranged to give an output signal to the maneuvering members (40, 41, 42) to move a gear which has been put into neutral out of neutral when at least one of the following conditions is fulfilled: i) said gear control (46) is not in said position which corresponds to automatically controlled gear shifting, ii) said auxiliary brake is not arranged for automatic activation, iii) said gear is outside of a predefined interval, iv) said driver activated brake is activated, v) said gas pedal is depressed, or vi) the engine has stopped or is in the process of stopping.

5. The gear box (9) as recited in claim 3 or 4, wherein said motor vehicle being arranged to be driven by means of an automatic cruise control, wherein the control unit (45) is arranged to give an output signal to the maneuvering members (40, 41, 42) to put said synchronized gear in the neutral position when the following conditions are met: i) a gear shifting member (46) of the gear box (9) is in a position which corresponds to automatically controlled gear shifting, ii) the auxiliary brake of the vehicle is arranged for automatic activation as needed, iii) the current gear of the gear box is within the pre-set upper interval of the gears of the gear box, iv) there is no request for auxiliary braking present, and v) there is no request for fuel which is considered to result in a delivered positive torque from the engine to the driving wheels of the vehicle.

6. The gear box (9) as recited in claim 5, wherein the control unit (45) is arranged to give output signals to the maneuvering members (40, 41, 42) to move the gear which has been put into neutral out of neutral when at least one of the following conditions is met: i) said gear shifting (46) is not in the position which corresponds to automatically controlled gear shifting, ii) said gear of the gear box is not within said upper interval, iii) there is a request for auxiliary braking, iv) there is a request for fuel which results in a positive torque from the engine to driving wheels of the vehicle, v) the gas pedal is depressed, or vi) the engine has stopped.

7. The gear box (9) as recited in claim 5, wherein the vehicle comprises an automatic auxiliary braking function which can be activated at a speed (vbc) which corresponds to an actual speed of the vehicle exceeding a speed (vcc) which has been set by the cruise control by a certain maximum value with the control unit (45) being arranged to permit that said synchronized gear is put into neutral position when the speed of the vehicle is higher than the speed (vcc) set by the cruise control but at the same time lower than the speed (vbc) at which auxiliary braking takes place.

8. The gear box (9) as recited in any one of claims 1 and 3–5, wherein the control unit (45) in case of a possible malfunction of said engine is arranged to: i) move the gear which has been put into neutral position out of the neutral position and thus to deactivate a free wheel function, ii) decouple a clutch (3) between said engine (1) and said gear box (9), iii) engage said gear, iv) engage the clutch (3) with the engine being allowed to be driven by the movement of the vehicle.

9. The gear box (9) as recited in claim 5, wherein the control unit (45) in case of a possible malfunction of said engine is arranged to: i) move the gear which has been put into neutral position out of the neutral position and thus to deactivate said free wheel function, ii) decouple a clutch (3) between said engine (1) and said gear box (9), iii) engage said gear, iv) engage the clutch (3) with the engine being allowed to be driven by the movement of the vehicle.

10. The gear box (9) as recited in claim 6, wherein the control unit (45) in case of a possible malfunction of said engine is arranged to: i) move the gear which has been put into neutral position out of the neutral position and thus to deactivate said free wheel function, ii) decouple a clutch (3) between said engine (1) and said gear box (9), iii) engage said gear, iv) engage the clutch (3) with the engine being allowed to be driven by the movement of the vehicle.

11. The gear box (9) as recited in claim 7, wherein the control unit (45) in case of a possible malfunction of said engine is arranged to: i) move the gear which has been put into neutral position out of the neutral position and thus to deactivate said free wheel function, ii) decouple a clutch (3) between said engine (1) and said gear box (9), iii) engage said gear, iv) engage the clutch (3) with the engine being allowed to be driven by the movement of the vehicle.

* * * * *